Jan. 9, 1951 D. C. RIDGE 2,537,422
POWER SCREW DRIVER
Filed July 1, 1949
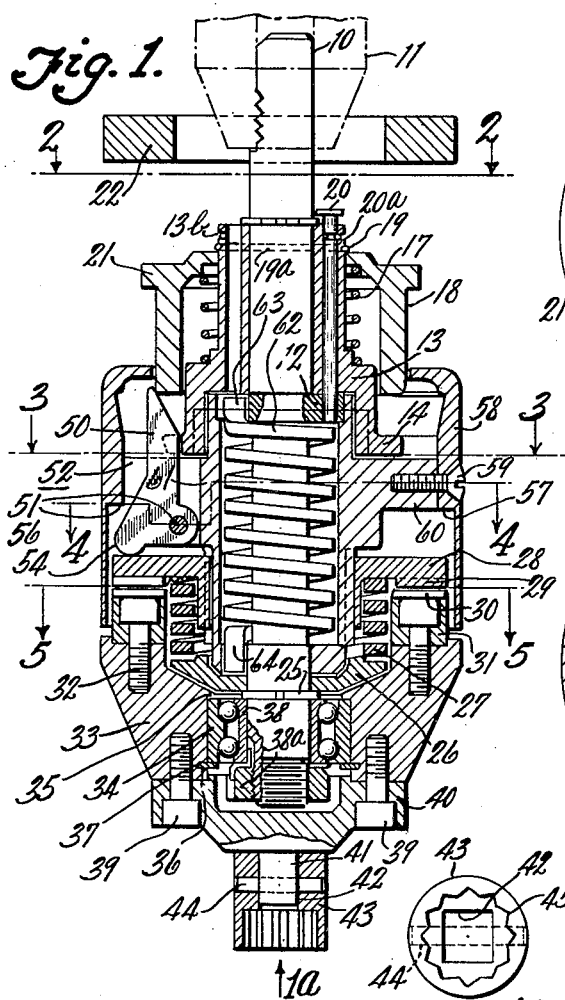
INVENTOR
DONALD C. RIDGE
BY Spencer Hardman & Fehr
his ATTORNEYS Patented Jan. 9, 1951

2,537,422

UNITED STATES PATENT OFFICE 2,537,422

POWER SCREW DRIVER

Donald C. Ridge, Anderson, Ind., assignor to General Motors Corporation, Detroit, Mich., a corporation of Delaware Application July 1, 1949, Serial No. 102,627

1 Claim. (Cl. 192—56)

This invention relates to power driven devices which apply a wrench or a screw-driver to a nut or a screw and which provide for automatic disconnection of the wrench or screw-driver from the power source when a nut or screw has been tightened. In my copending application, Serial No. 83,547, filed March 26, 1949, I disclose a power screw-driver and nut tightener having a torque transmitting spring and clutch members through which power is transmitted to a screw-driver blade or a socket wrench and means for effecting complete separation of the clutch members when a predetermined torque is exceeded so that the device will be quiet in operation and no wear will occur although the device may remain in engagement with the nut or screw which it has tightened. The device provides for automatic reengagement of the clutch members in response to retraction from the nut or screw. Provision is made for the adjustment of the torque which can be transmitted before the clutch members are separated.

An object of the present invention is to obtain an adjustment of the torque transmitting spring which is finer than that disclosed in my copending application in order to make practical the use of a heavier torque transmitting spring.

Further objects and advantages of the present invention will be apparent from the following description, reference being had to the accompanying drawings, wherein a preferred embodiment of the present invention is clearly shown.

In the drawings:

Fig. 1 is a longitudinal, sectional view of the device in association with a chuck shown in dot-dash lines and a stop member with which the device engages.

Fig. 1a is a view in the direction of arrow 1a of Fig. 1 and shows the bottom of a socket wrench attached to the device.

Figs. 2, 3, 4 and 5 are sectional views taken on lines 2—2, 3—3, 4—4 and 5—5, respectively, of Fig. 1.

Fig. 5a is a fragmentary side view of one of the clutch members and is looking in the direction of arrow 5a of Fig. 5.

The device includes a shaft 10 (Fig. 1) connected with a power source by a chuck 11 shown in dot-dash lines. Shaft 10 provides a collar 12 which supports a sleeve 13 having a flange 14 provided with relatively shallow notches having bottom surfaces 15 (Fig. 3) and deeper notches having bottom surfaces 16. Sleeve 13 is engaged by a compression spring 17 urging upwardly a sleeve 18 against a snap ring 19 received by a groove 19a in a shaft 10. A pin 20 is recived by one of a row of holes 13a in sleeve 13 and by one of a row of holes 12a in collar 12. Sleeve 18 has a flange 21 adapted to engage a fixed stop member 22 provided by the framework of the power device which operates the chuck 11. This device is not shown but, as known to those skilled in the art, it comprises a mechanism operated by an electric motor for driving the chuck 11 which can be lowered and raised automatically or manually.

A snap ring 25 which is received by a groove in the shaft 10 supports a disc 26 which receives a compression spring 27 which urges upwardly a clutch member 28 having teeth 29 for engaging similar teeth 30 provided by a clutch member 31 which screws 32 attach to a block 33 which is supported by the shaft 10 through the medium of a thrust ball bearing whose outer race 34 is confined between a ledge 35 provided by block 33 and a ledge provided by a snap ring 36 received by a groove 37 in block 33. The inner race 38 of the bearing is confined between the snap ring 25 and a nut 38a received by the threaded lower end of shaft 10. Screws 39 secure to the block 33 a disc 40 having a square shank 41 received by a square hole 42 in a socket wrench 43 attached to shank 41 by a pin 44. The wrench 43 provides a socket having twelve notches 45 (Fig. 1a), alternate ones of which are engageable with a hexagonal nut of a certain size.

As shown in Fig. 1, the clutch member 28 is separated from the clutch member 31. Under this condition the deeper notch surfaces 16 of flange 14 (Fig. 3) receive portions of levers 50 pivoted on screw pins 51 (Fig. 4) attached to a spider 52 having three arms 53 which are notched to receive the levers 50. Each lever 50 has a cam surface 54 against which the spring 27 urges the clutch member 28. Therefore, the spider 52 is supported by the shaft 10 through the snap ring 25, disc 26, spring 27, clutch member 28, levers 50 and pins 51. The spider arms 53 provide ledges 56 which receive an annular shoulder 57 provided by a shell 58 which screws 59 attach to spider arms 60 (Fig. 4). Shell 58 provides in its upper wall a central opening for receiving the sleeve 18. The spider arms extend from a tubular hub 61 through which the shaft 10 extends and this hub provides a recess for a torque transmitting spring 62 which is wound left hand and has an end 63 connected with a collar 12 and an end 64 connected with the spider hub 61. This hub is connected with the clutch member 28 through splines 65 provided by the hub and splines 66 provided by the clutch member.

The device is adjustable to transmit a certain torque before the clutch members are disengaged. To do this the shell or case 58 is clamped and pin 20 is removed. The levers 50, being in the deeper notches of flange 40, tie the sleeve 13 to the spider to which the lower end 64 of the spring 62 is attached. The shaft 10 is turned clockwise (looking down upon it) through the medium of a device which will indicate the torque applied to the shaft. When that torque is a certain amount, the pin 20 is placed in that hole 13a of sleeve 13 which is nearest in alignment with a hole 12a of collar 12. To secure alignment, the shaft 10 is rotated slightly so that the pin 20 can be passed into a hole 12a. Holes 13a are spaced $$\frac{360}{12} \text{ or } 30°$$

for example, and holes 12a are spaced $$\frac{360}{13} \text{ degrees}$$

Therefore, the maximum sum angular distance through which shaft 10 would be rotated to secure exact alignment of the nearest aligned holes would be $\frac{1}{2} \times \frac{1}{12} \times \frac{1}{13} \times 360°$ or 1.153°. The torsional stress in spring 62 will therefore be close enough to the predetermined amount for all practical purposes. The fine adjustment thus provided makes practical the use of a relatively heavy torque transmitting spring required for heavy duty power screw-drivers and wrenches. Snap ring 20a received by a groove 13b in sleeve 13 and a groove 20b in pin 20, retains the pin 20.

The chuck 11 is lowered to facilitate attaching the shaft 10 thereto and the chuck is raised to its upper limit at which the stop 22 is engaged by the flange 21 of sleeve 18. This causes the lower edge of the sleeve 18 to pry the upper ends of the levers 50 outwardly to release the levers from the deeper notch surfaces 16 and to permit them to be received by the shallower notch surfaces 15, the levers 50 being rotated counterclockwise as viewed in Fig. 3 by the spring 62 into the dot-dash line positions 50′ and against the shoulders 15a of the shallower notches. This outward movement of the upper ends of levers 50 causes the clutch member 28 to be brought into engaging relation with the clutch member 31 and the spring 27 is further compressed to urge the levers 50 against the surfaces 15 of the shallower notches. Rotary movement of the chuck in a clockwise direction looking down on the shaft is transmitted to socket wrench 43 through the shaft, the torsion spring 62, the spider hub 52, the splines 65 and 66 (Fig. 4), the clutch member 28 and through its teeth 29 to the teeth 30 of the clutch member 31 and thence through the block 33, the plate 40 to the wrench 43 which is applied to a nut by lowering the chuck 11.

As the nut is tightened and resistance is encountered by the wrench 43, the wrench tends to lag behind, thereby causing an increase of torsion of spring 62 up to the value at which the clutch member should be separated. Accompanying this winding of the spring 62 relative motion occurs in a clockwise direction as viewed in Fig. 3 between the levers 50 and the flange 14 of sleeve 13. By the time the spring 62 is transmitting the maximum allowable torque, the levers 50 will have been located in radial alignment with the deeper notch surfaces 16 whereupon the spring 27 is released to disengage clutch member 28 from clutch member 31 and to force the levers 50 against the deeper notch surfaces 16. Thereafter no torque is transmitted to the wrench 43 since the clutch members are completely disengaged; and, furthermore, the device operates without noise and wear since there are no clutch teeth snapping over one another.

During the latter part of the upward movement of the chuck 11 to retract the wrench from the nut, the flange 21 of sleeve 18 engages the stop 22 thereby causing such relative movement between the sleeve 14 and sleeve 18 that the levers 50 are pried outwardly so that, due to the action of the spring 62, they will be moved relatively counterclockwise as viewed in Fig. 3 back into the position 50′ and the clutch will be reengaged.

The device is adapted for use with a machine in which parts to which nuts or screws are to be applied and tightened are mounted on workholders carried by a rotary conveyor or dial which moves intermittently to locate the work successively in alignment with the device, and in which the longitudinal movements of the chuck are coordinated automatically with the movements of the dial so that, while the dial is stationary, the device moves into engagement with the nut or screw to tighten it and out of engagement before the dial starts moving. The timing of the elevation of the device is not critical since there is no noise and wear when nut or screw tightening ceases because the clutch members are separated.

While the embodiment of the present invention as herein disclosed, constitutes a preferred form, it is to be understood that other forms might be adopted.

What is claimed is as follows:

A power driven nut or screw tightener comprising a shaft to be connected with a rotary power driven shaft, a member adapted to be attached to a wrench or a screw-driver blade, transmission means between the shaft and member and including a torsion spring connected at one end with the shaft, a clutch having a driven element connected with said member and a driving element and a part connected with the other end of the torsion spring and providing a longitudinal spline connection with the driving element, a compression spring for separating the driving element from the driven element, a sleeve surrounding the shaft and having a flange providing adjacent shallow and deep notches, a collar on the shaft adjacent one end of the sleeve, means for connecting the collar and sleeve in various angular relations and comprising a pin received by one of a circular row of holes in the sleeve and parallel to the shaft and received by one of a circular row of holes in the collar and parallel to the shaft, the spacing of the holes of the sleeve differing from the spacing of the holes of the collar, a movable latch supported by said part and moved by the driving clutch member under the action of said compression spring into the deeper notch of the sleeve flange when aligned therewith and means for effecting movement of the latch to retract it from the deeper notch and to cause it to move the clutch driving element into engagement with the driven clutch element against the action of the compression spring, the torsion spring then causing said part to turn relative to the sleeve so that the shallower notch of the sleeve flange is presented for engagement by the latch.

DONALD C. RIDGE.

REFERENCES CITED

The following references are of record in the file of this patent:

UNITED STATES PATENTS

| Number | Name | Date |
|---|---|---|
| 1,912,011 | Riess et al. | May 30, 1933 |